April 4, 1961     R. S. COATE ET AL     2,978,540
TELEVISION TEST APPARATUS

Filed June 14, 1956     2 Sheets-Sheet 1

INVENTORS
RALPH S. COATE &
BY SAUL KOREN

ATTORNEY

INVENTORS
RALPH S. COATE &
SAUL KOREN
BY
ATTORNEY

United States Patent Office 2,978,540
Patented Apr. 4, 1961

2,978,540

TELEVISION TEST APPARATUS

Ralph S. Coate, Haddonfield, and Saul Koren, Woodbury, N.J., assignors to Radio Corporation of America, a corporation of Delaware Filed June 14, 1956, Ser. No. 591,474

8 Claims. (Cl. 178—7.5)

The present invention relates to signal generating apparatus and, particularly, to apparatus for producing signals useful in the testing of color television receivers. Specifically, the present invention is an improvement on the apparatus disclosed in the copending application of Koren, S.N. 434,941, filed June 7, 1954, now Patent No. 2,896,109, granted July 21, 1959 for "Television Test Apparatus."

In color television receivers of the type presently produced on a commercial basis, there is employed a display device or image reproducing cathode ray tube in which electron beams from a plurality of sources are caused to scan a target screen made up of a plurality of elemental areas of phosphor material having different color light-emitting characteristics. For example, the elemental areas may be arranged in the form of triads such that the dots are located at the apices of equilateral triangles. An apertured electrode or shadow mask located between the electron beam sources and the target screen contains a plurality of apertures located in such relation to the phosphor triads as to direct electron beams toward proper ones of the phosphor areas. Proper operation of such a cathode ray tube kinescope requires that the several electron beams converge at all points of the screen so that, in passage through the shadow mask, the beams will impinge upon only those phosphor areas which produce light of the color whose intensity is controlled by the particular beam. Since, as stated, the several beams should converge at all points on the screen, means are provided in conventional receivers for effecting such convergence on a dynamic, as well as static, basis. Such convergence circuitry is illustrated and described in an article entitled "Deflection and Convergence in Color Kinescopes" by A. W. Friend which appeared in the October 1951 issue of Proceedings of the IRE.

In order that color television receivers may be adjusted for proper deflection and convergence, it is desirable to provide means for producing a test pattern on the kinescope of such a receiver whereby convergence adjustment may be readily determined. Thus, apparatus such as that described in the above-cited copending application of Koren has been produced, which apparatus generates a test pattern of such configuration as to provide, selectively, vertical and/or horizontal bars or an array of dots. Specifically, according to the apparatus of the Koren application, the dots, bars and grid or cross-hatch pattern are derived from a circuit which produces a waveform from which either the horizontal bars, the vertical bars, the dot pattern or the grid pattern may be readily derived. This wave includes a low frequency signal and a high frequency signal which may be clipped at various amplitudes to provide the type of output pattern desired.

It is an object of the present invention to provide new and improved apparatus for generating a wave from which test patterns of the type described may be readily derived.

In general, the present invention includes means for coupling to the scanning circuitry of the television receiver under test for the derivation of the high frequency (i.e., horizontal) deflection synchronizing signals available therein. Means are included in accordance with the present invention for producing from the deflection information thus derived from the receiver the requisite pulse trains required for generating both the vertical and horizontal bars of a test pattern to be reproduced by the receiver display tube. As will be recognized, the present invention affords a simpler arrangement for deriving the scanning synchronizing information from the receiver under test and, in addition, results in improved operation of the test signal generator, in that the pattern produced thereby is a completely interlaced one.

Additional objects and advantages of the present invention will become apparent to those skilled in the art from a study of the following detailed description of the accompanying drawings, in which.

Figure 1:
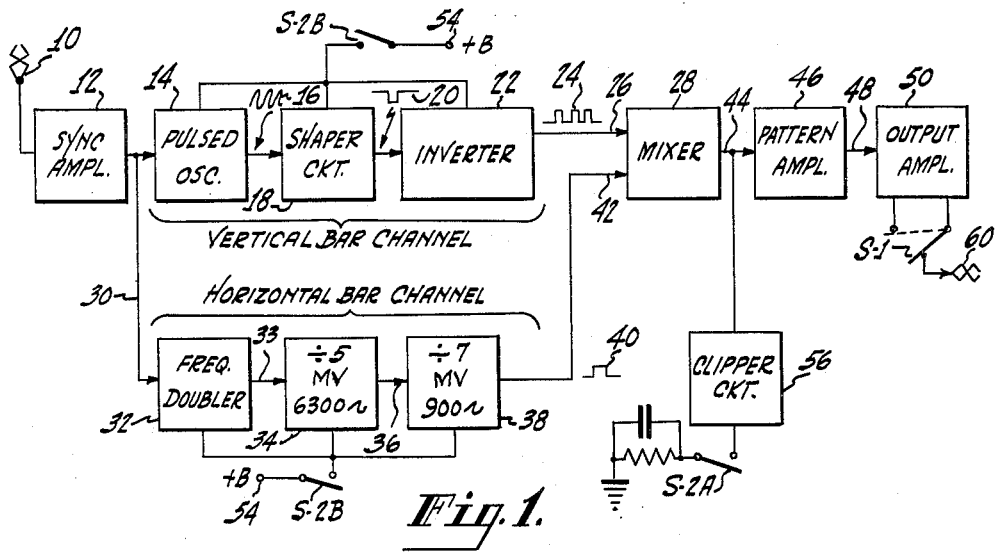
Figure 1 illustrates, by way of a block diagram, a test generator in accordance with the present invention.

Referring to the drawing and, particularly, to Figure 1 thereof, there is shown, by way of a block diagram, apparatus in accordance with one form of the present invention. Since the present apparatus is designed so that it may be used with a television receiver which is being tested, means are provided for coupling into the receiver circuitry to derive scanning synchronizing information therefrom. Thus, a clip 10 is provided for clipping onto the lead in the receiver which applies energy to the horizontal deflection winding of the receiver deflection yoke. It will be understood, therefore, that, in order for the present apparatus to be employed, the television receiver should first be tuned to a television channel so that it receives therefrom the usual line and field synchronizing pulses. With the clip 10 connected in the manner described to the receiver deflection circuitry, television line or horizontal deflection rate pulses of approximately 15.75 kcs. are applied via the clip to a synchronizing pulse amplifier 12 which serves to amplify the high frequency pulses.

Before describing further the present apparatus, note may be made of the fact that, in accordance with the present invention, only a single coupling to the receiver under test is required for the derivation of synchronizing pulse information. This arrangement is to be contrasted with that disclosed in the above-cited copending application in which means are provided for coupling to both the horizontal and vertical deflection circuitry for the derivation of both line and field rate pulses. It will be appreciated by those skilled in the art that the single coupling of the present invention is a simplification over earlier arrangements. Moreover, it has been found that, by reason of their lower frequency, the vertical deflection rate pulses are more difficult to couple from receiver circuitry into the test signal generating apparatus, so that earlier equipments have presented the problem of deriving properly phased horizontal and vertical synchronizing information from receivers under test.

The amplified horizontal synchronizing pulses are applied from the sync amplifier 12 to two channels, namely, a vertical bar channel and a horizontal bar channel. The vertical bar channel comprises a pulsed oscillator 14 which produces a ringing voltage whose frequency may be varied from approximately 142 kcs. to 391 kcs. The output wave 16 from the pulsed oscillator 14 is applied to a pulse shaping circuit 18 which serves to form generally rectangular pulses 20 of negative polarity from the ringing voltage provided by the oscillator 14. The pulses 20 are inverted in polarity through the agency of a phase inverter or polarity reverser stage 22 and the resultant positive-going pulses 24 are applied to one input terminal 26 of a mixer or adder stage 28.

The horizontal bar channel also receives, as stated, the amplified horizontal deflection frequency pulses from the amplifier 12 via a lead 30 and includes a frequency doubler stage 32 which serves to provide at its output lead 33 a wave of twice the horizontal deflection frequency, or approximately 31.5 kcs. The 31.5 kcs. wave is, in turn, applied to a frequency dividing stage 34 which may comprise a 6300 c.p.s. monostable multivibrator circuit and which serves to divide the input wave frequency by 5. Thus, the output wave of the circuit 34 is a series of pulses of 6300 c.p.s. in frequency. These pulses are applied via a lead 36 to an additional divider circuit 38 which may be similar in form to the circuit 34 and which serves to divide the input frequency by 7. Thus, the output wave of the circuit 38 is a series of pulses 40 having a frequency of 900 c.p.s., which pulses are applied to a second input terminal 42 of the mixer circuit 28.

Although specific circuitry for performing the functions of the several blocks of Figure 1 will be described hereinafter in connection with the schematic diagram of Figure 2, it may be noted that the wave 40 applied to the terminal 42 of the mixer 28 is illustrated by waveform (a) in Figure 3, while the wave 24 applied to the terminal 26 is illustrated by waveform (b) of Figure 3. The mixer stage 28 serves to add the two input waves and provides at its output lead 44 a composite wave such as that shown by waveform (c) of Figure 3 in which certain of the higher frequency pulses 24 from the vertical bar channel are superimposed upon the lower frequency pulses 40 from the horizontal bar channel. The composite wave is amplified in a pattern amplifier 46 and is applied to the input terminal 48 of an output amplifier 50. Associated with the amplifier 50 is a switching arrangement S1 illustrated diagrammatically in Figure 1 and through the agency of which either a positive-going or negative-going version of the composite wave may be applied to the output terminal 52 of the test generator. Prior to describing the manner in which the output signal may be employed in testing a receiver for deflection linearity and convergence, certain additional circuitry should be noted.

As shown in Figure 1, the circuits comprising the vertical bar channel, namely, the oscillator 14, shaping circuit 18 and phase inverter 22 are adapted for selective energization and de-energization through the agency of a switch S2B which controls the application of positive operating voltage (+B) from terminal 54 to the anodes of several electron tubes included in the enumerated circuits. When the switch S2B is closed so that +B voltage is applied to the tubes of the vertical bar channel, that channel is operative to produce the pulses 24. Similarly, the switch S2B controls the application of positive operating voltage from the terminal 54 to the anodes of the several tubes included in the horizontal bar channel (switch S2B and +B terminal being shown in two places in Figure 1 in the interest of simplicity of illustration, although a single switch actually serves to perform both functions, as will be recognized from the showing of Figure 2). When the switch 54 is closed, the horizontal bar channel is operative to produce the pulses 40 which are applied to the mixer 28. The switch S2B serves, therefore, to activate or disable either of the vertical and horizontal bar channels. When both of the channels are operative, the composite pattern shown in Figure 3(c) is provided at the output lead 44 of the mixer circuit. This signal is clipped by the grid bias of the pattern amplifier to remove those high frequency pulses which occur during the low frequency pulses. When applied to the several electron guns of a color kinescope, the signal produces a crosshatched pattern of vertical and horizontal bars on the kinescope screen, the vertical bars being produced by the pulses 24 and variable in number from 8 to 22 (corresponding to variations of the frequency of the oscillator 14 from 142 to 391 kcs.).

With switch S2B in such position as to inactivate the vertical channel, for example, the pattern produced on the kinescope screen comprises a plurality (e.g., 19) of horizontal bars.

In addition to the foregoing described circuitry of Figure 1, means are provided for producing a dot pattern on the screen of the kinescope of the receiver under test. Specifically, a clipping circuit 56 is connected in shunt with the mixer circuit output lead 44 and a point of reference potential (ground). Associated with the clipping circuit 56 is a switch S2A which serves selectively to connect or disconnect the clipping circuit from the lead 44. With the switch S2A in its open position (as shown in the drawing), the action of the apparatus of Figure 1 is as described. When the switch S2A is closed, however, placing the clipper 56 in circuit with the mixer output lead, the composite signal at the lead 44 is clipped along the level shown by the dotted line 58 in Figure 3(c). The result of this clipping action is the production of a wave such as that shown by the wave (d) of Figure 3 which consists only of those higher frequency pulses 24 which occur during each of the lower frequency pulses 40. The application of the waveform (d) of Figure 3 to the image reproducing tube of the receiver produces a display of spaced dots on its screen.

As has been indicated, the polarity of the test signal applied to the receiver may be selected by means of the switch S1 so that either positive or negative test signals are applied to the receiver. In accordance with the apparatus shown in Figure 1, it will be recognized that the test signal may be applied to any point in the receiver video amplifier stages following the point at which the synchronizing pulses are removed from the remainder of the signal, a suitable clamp 60 being provided at the output terminal 52 for ready connection to the receiver circuitry.

It will further be recognized that by virtue of the fact that the pulse trains which produce both the vertical and horizontal bars of the pattern are derived from the horizontal deflection pulses in the receiver which is tuned to a television channel, the horizontal and vertical bars of the pattern will necessarily be in proper synchronism with the receiver deflection circuits. More specifically, since the low frequency pulses which produce the horizontal bars of the test pattern are derived by dividing down from the horizontal frequency sync pulses from the receiver under test, the resultant pattern will necessarily be completely interlaced in that all of the horizontal bars begin at the same point with respect to the line scanning periods. This synchronous operation, moreover, is afforded through the use of only a single coupling to the receiver under test and in a manner which eliminates problems of deriving the low frequency vertical deflection pulses from the receiver.

Figure 2:
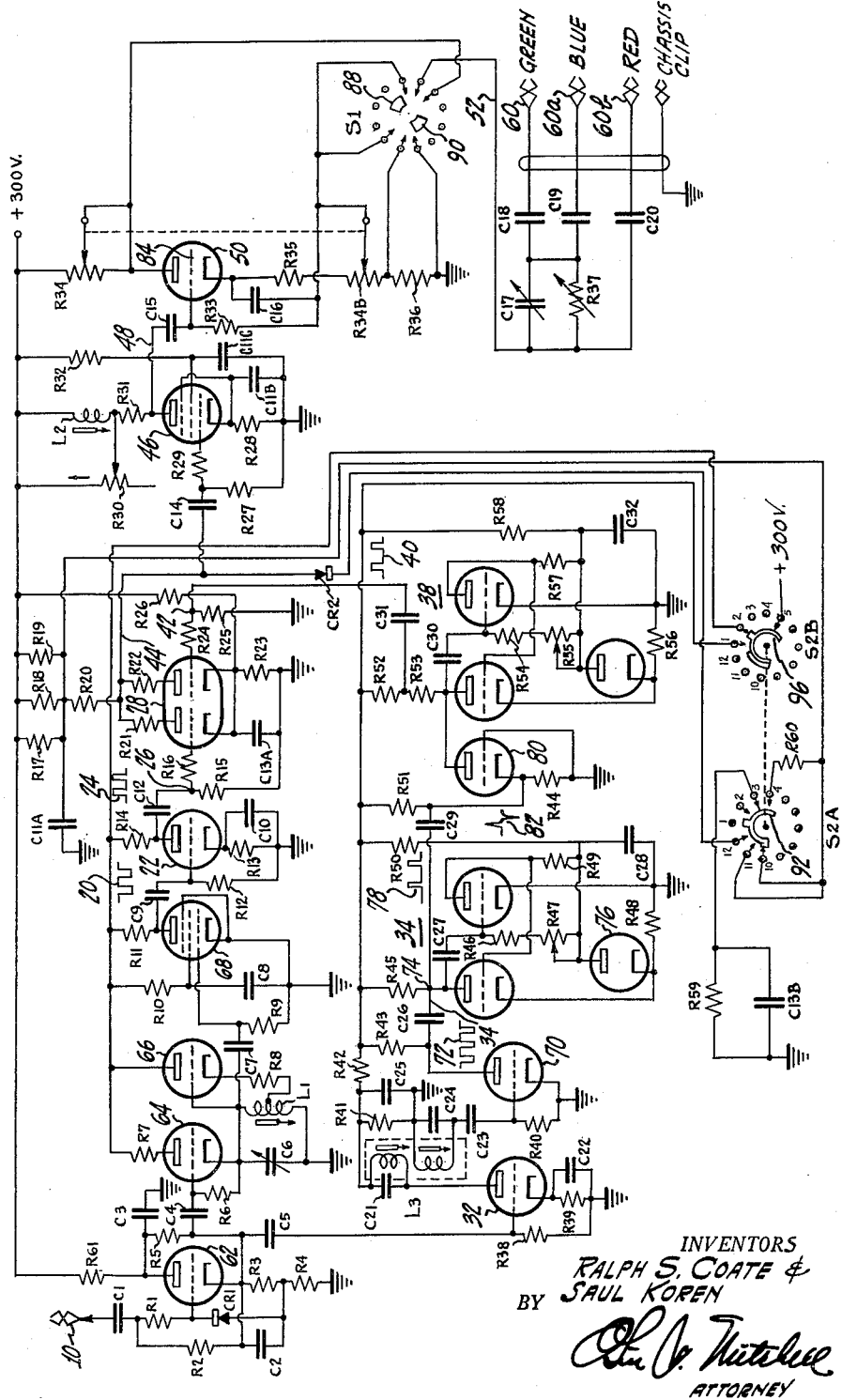
Figure 2 is a schematic diagram of a specific form of the invention.

Figure 2 is arranged in generally the same manner as the block diagram of Figure 1 in the interest of simplifying correlation of the schematic diagram with the block diagram and reference numerals identical to those employed in Figure 1 designate corresponding elements of Figure 2. In Figure 2, horizontal synchronizing pulse signals from the receiver under test are applied via the clip 10 and a coupling capacitor C1 to the control grid 62 of the sync pulse amplifier 12. The input circuit of the amplifier 12 comprises a network including a crystal diode CR1 connected between the control grid of the tube and a point intermediate its cathode resistors R3 and R4 for limiting the amplitude of the signal applied to the amplifier. The amplified horizontal synchronizing pulses are represented in waveform (a) of Figure 4 and are applied simultaneously from the cathode of the amplifier 12 to the vertical and horizontal bar channels.

The pulsed oscillator of the vertical bar channel comprises a first tube 64 having a ringing circuit made up of the capacitor C6 and inductance L1 in its cathode circuit for producing a series of damped oscillations of a frequency between 142 kc. and 391 kc., depending upon the adjustment of the capacitor C6. This ringing is sustained by the action of the tube 66 whose cathode resistor R8 is of such size as to render the tube 66 capable of sustaining the ringing at a substantially constant level. The ringing voltage is applied from the cathode of the pulsed oscillator tube 64 to the control grid of the shaper circuit tube 68 which is so arranged as to be biased by the applied ringing voltage so that it conducts only for the positive-going peaks of the applied voltage. The shaped pulses 20 are, in turn, applied to the control grid of the phase inverter tube 22 which comprise a conventional amplifier circuit to provide a 180° phase reversal between its input and output terminals. The resultant positive-going pulses 24 are applied via a coupling capacitor C12 to the control grid of the left hand section of the double triode 28 of the mixer stage, the two anodes of the tube 28 being connected to a common output lead 44.

The amplified horizontal sync pulses from the amplifier 12 are also applied via the coupling capacitor C5 to the control grid of the frequency doubler tube 32 which includes, in circuit with its anode, a tuned circuit comprising a capacitor C21 and inductance L3 which are resonant at twice the horizontal line frequency or 31.5 kcs. The 31.5 kcs. wave is illustrated in waveform (b) of Figure 4 and is applied through the inductive coupling winding L3 to the control grid of a shaper tube 70 associated with the doubler and which performs a function similar to that described in connection with the vertical bar shaper tube 68 to produce a series of output pulses represented by waveform (c) of Figure 4. Waveform (c) comprises a series of negative-going pulses of short duration and occurring at the rate of 31.5 kcs. These pulses, indicated in the drawing by reference numeral 72, are applied to the input terminal 74 of the multivibrator 34 which is of generally conventional arrangement but which includes a clamping diode 76 for the purpose of maintaining the voltage at the cathode of the left hand tube of the multivibrator at a constant level.

The multivibrator 34 produces at its output lead 36 a series of pulses 78 which occur a the rate of 6300 per second. Since the multivibrator 34 is triggered by the pulses 72, it will be appreciated that the dividing action of the multivibrator 34 is not subject to undesirable "slippage" with respect to the horizontal synchronizing pulses. The pulses 78 are differentiated by a network comprising the capacitor C29 and resistors R51 and R44 to produce alternate positive- and negative-going spikes at the cathode of a coupling tube 80. The coupling tube 80 serves to pass only the negative-going spikes of the differentiated waveform 82 (corresponding to the trailing edges of the pulses 78), so that the negative spikes trigger the second multivibrator 38.

Figures 3, 4:
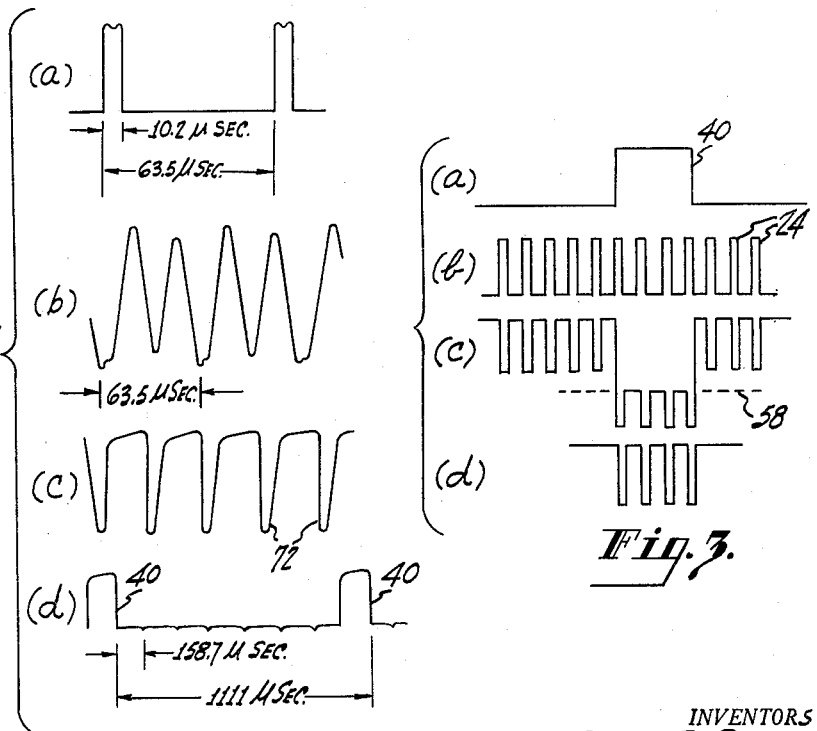
Figures 3 and 4 illustrate waveforms present at various points in the apparatus of Figure 2.

The multivibrator 38 is, as in the case of the multivibrator 34, a monostable multivibrator and serves to divide the frequency of the input pulses by 7 to produce at its output lead pulses occurring at the rate of 900 c.p.s., which pulses are illustrated by waveform (d) of Figure 4. These pulses are applied via a coupling capacitor C31 to the input terminal 42 connected to the control grid of the right hand section of the mixer tube 28.

The output lead 44 of the mixer tube is connected via a coupling capacitor C14 to the control grid of the pattern amplifier tube 46 whose grid bias is such as to clip off the high frequency pulses below the level 58 in Figure 3 during cross-hatch production. A potentiometer R30 controls its relative gain as to the low and high frequency pulses. The amplified wave is coupled via the lead 48 to the control grid 84 of the output amplifier 50.

As will be noted from Figure 2, the anode circuit of the tube 50 includes a load resistor R34A, while the cathode circuit of the tube 50 includes the series combination of resistors R34B, R35 and R36. As will be recognized from the drawing, the switch S1B serves to connect the output lead 52 to either the anode or cathode circuits of the tube 50 so that either polarity of output signal may be applied to the clips 60, 60a and 60b. The clips 60, 60a and 60b are designated for connection to the green, blue and red signals of the video amplification stages of the receiver under test, in accordance with the use to which the test generator may be put.

Further in connection with the switch S1, it will be seen that the switch includes a rotary member consisting of a pair of conductive areas 88 and 90 of such configuration that, when the switch is rotated so that the portion 88 is in contact with the terminals Nos. "3" and "4," the signal at the lead 52 is derived from the cathode circuit of the tube 50. In order to derive the output signal from the anode of the amplifier tube 50, the switch is rotated until the portion 88 contacts the terminals "4" and "5," as will be apparent from the drawing.

The clipping circuit comprises a crystal diode CR2 whose anode is connected to the mixer output lead 44 and whose cathode is connected to one of the terminals (terminal "12") of the switch S2A. In order for the clipping diode CR2 to be rendered operative, it must be connected electrically to the parallel combination of a resistor R59 and capacitor C13B through the switch S2A. In the position shown in the drawing, the clipping diode CR2 is effectively disconnected. When, however, the switch S2A is rotated clockwise so that its conductive rotary member 92 connects the terminals "3" and "12" to each other, the diode cathode is effectively connected to the junction of the resistor-capacitor combination, completing the diode circuit to ground reference potential. The resistor R59 and capacitor C13B serve to place the proper positive bias on the cathode of the clipping diode so that it clips the signal at the proper level shown in Figure 3(c).

Finally in connection with the circuit diagram of Figure 2, it will be seen that the switch S2B serves selectively to connect and disconnect the vertical and horizontal bar channel tube anodes to the source of positive operating voltage (+300 volts) at the terminal 54. In the position of the switch S2B shown in the drawing, the vertical bar channel is supplied with operating voltage so that it is operative to produce the pulses 24. The horizontal bar channel is, however, disabled in this position of the switch, since the terminal "1" of switch S2B which is connected to the anodes of the tubes of the horizontal bar channel is disconnected from the terminal "5." When the switch is rotated in a clockwise direction until both terminals "1" and "2" are contacted by the rotary switch member 96, the terminal 54 is connected to both the horizontal and vertical bar channels, so that both channels are rendered operative. Conversely, when the switch 96 is rotated counter-clockwise by one position, the terminal "2" leading to the vertical bar channel is disconnected, while the terminal "1" leading to the horizontal bar channel is connected to the source of operating voltage. It will be seen from the drawing that switch S2A is ganged to switch S2B so that the clipping circuit can be operative only when both the vertical and horizontal bar channels are in operation.

From the foregoing, it will be recognized that the present invention provides positive acting circuitry, free of undesirable "slippage" between pulse trains, for producing the requisite signals for the vertical bars, horizontal bars, a crosshatch pattern of both vertical and horizontal bars or a dot pattern on the kinescope screen under test.

The following circuit component values are illustrative of an operative embodiment of the form of the present invention shown in Figure 2 and are given only by way of example, all resistor values being in ohms and all capacitor values being in terms of micro-micro-farads (mmf.) unless otherwise indicated:

| | | | |
|---|---|---|---|
| R1 | 220K | R32 | 24K |
| R2 | 1M | R33 | 2.2M |
| R3 | 18K | R34A | 1K |
| R4 | 18K | R34B | 5K |
| R5 | 100K | R35 | 2.2K |
| R6 | 5.6M | R36 | 1K |
| R7 | 18K | R37 | 1K |
| R8 | 16K | R38 | 1M |
| R9 | 470K | R39 | 27K |
| R10 | 270K | R40 | 1M |
| R11 | 1K | R41 | 150K |
| R12 | 220K | R42 | 150K |
| R13 | 330 | R43 | 15K |
| R14 | 2.2K | R44 | 56K |
| R15 | 56K | R45 | 15K |
| R16 | 220 | R46 | 1.8M |
| R17 | 47K | R47 | 500K |
| R18 | 47K | R48 | 15K |
| R19 | 47K | R49 | 10K |
| R20 | 1K | R50 | 220K |
| R21 | 1K | R51 | 560K |
| R22 | 1K | R52 | 7.5K |
| R23 | 1.5K | R53 | 7.5K |
| R24 | 47K | R54 | 1.8M |
| R25 | 150K | R55 | 500K |
| R26 | 100K | R56 | 15K |
| R27 | 560K | R57 | 10K |
| R28 | 82 | R58 | 220K |
| R29 | 560 | R59 | 5.6K |
| R30 | 5K | R60 | 1.5K |
| R31 | 4K | R61 | 150K |
| C1 | 150 | C16 | 30 |
| C2 | 0.047 mf. | C17 | 170—780 |
| C3 | 0.047 mf. | C18 | 1 mf. |
| C4 | 470 | C19 | 1 mf. |
| C5 | 470 | C20 | 1 mf. |
| C6 | 290 | C21 | 2200 |
| C7 | 470 | C22 | 0.01 mf. |
| C8 | 0.022 mf. | C23 | 220 |
| C9 | 470 | C24 | 2200 |
| C10 | 0.01 mf. | C25 | 0.01 mf. |
| C11A | 20 mf. | C26 | 18 |
| C11B | 100 mf. | C27 | 100 |
| C11C | 20 mf. | C28 | 0.022 mf. |
| C12 | 220 | C29 | 100 |
| C13A | 50 mf. | C30 | 820 |
| C13B | 30 mf. | C31 | 0.01 mf. |
| C14 | 0.1 mf. | C32 | 0.47 mf. |
| C15 | 0.1 mf. | | |

Having thus described our invention, what we claim as new and desire to secure by Letters Patent is:

1. Test signal generating apparatus for use in testing a television receiver of the type employing an image-reproducing kinescope in which an electron beam is adapted to scan a target screen and having scanning circuitry associated therewith operative to deflect such beam in first and second directions at first and second frequencies, said apparatus comprising: means for coupling to the scanning circuitry of a receiver to derive therefrom a train of signals of such first frequency; pulse generating means responsive to such signals for generating first and second trains of pulses bearing respectively higher and lower frequency relations to such first frequency; and coupling means for applying pulses from said pulse generating means to such receiver for modulating the intensity of such electron beam to display a pattern corresponding to such generated pulses.

2. Test signal generating apparatus for use in testing a television receiver of the type employing an image-reproducing kinescope in which an electron beam is adapted to scan a target screen and having scanning circuitry associated therewith operative to deflect such beam horizontally and vertically at first and second frequencies, respectively, said apparatus comprising: means for coupling to the scanning circuitry of a receiver to derive therefrom a train of horizontal deflection frequency signals; pulse generating means responsive to such signals for generating first and second trains of pulses, each train bearing a fixed frequency relation to such horizontal deflection frequency, the frequency of one train being higher and the frequency of the other train being lower than such horizontal deflection frequency; and coupling means for applying pulses from said pulse generating means to such receiver for modulating the intensity of such electron beam to cause such receiver kinescope to display a pattern corresponding to such generated pulses.

3. Test signal generating apparatus for use in testing a television receiver of the type employing an image-reproducing kinescope in which an electron beam is adapted to scan a target screen and having scanning circuitry associated therewith operative to deflect such beam horizontally and vertically at first and second frequencies, respectively, said apparatus comprising: means for coupling to the scanning circuitry of a receiver to derive therefrom a train of signals of such horizontal deflection frequency; means responsive to such derived signals for generating a first train of pulses of higher frequency than such horizontal deflection frequency; means responsive to such derived signals for generating a second train of pulses of lower frequency than such horizontal deflection frequency; and circuit means for selectively applying pulses from said first and second-named pulse generating means to such receiver in such manner as to cause such receiver to display a pattern corresponding to the applied pulses.

4. Test signal generating apparatus for use in testing a television receiver of the type employing an image-reproducing kinescope in which an electron beam is adapted to scan a target screen and having scanning circuitry associated therewith operatively to deflect such beam horizontally and vertically at first and second frequencies, respectively, said apparatus comprising: means for deriving a train of signals corresponding to the horizontal deflection frequency of a receiver; first pulse generating means coupled to said pulse-deriving means for generating a first train of pulses of substantially higher frequency than such horizontal deflection frequency; second pulse-generating means including frequency dividing means for producing a second train of pulses of substantially lower frequency than such horizontal deflection frequency; mixing means coupled to said first and second pulse-generating means for additively combining such first and second trains of pulses; and coupling means for applying pulses from said mixing means to a receiver for modulating the intensity of such electron beam to cause such receiver to display a pattern corresponding to such generated pulses.

5. Test signal generating apparatus for use in testing a television receiver of the type employing an image-reproducing kinescope in which an electron beam is adapted to scan a target screen and having scanning circuitry associated therewith operative to deflect such beam horizontally and vertically at first and second frequencies, respectively, to produce a scanning raster, said apparatus comprising: means for deriving a train of signals corresponding in frequency to such horizontal deflection frequency; first pulse-generating means responsive to such derived signals for producing a train of pulses of frequency greater than such horizontal deflection frequency; second pulse-generating means for receiving such derived signals and including frequency multiplying and frequency dividing means for producing a second train of pulses whose frequency is an integral quotient of an even harmonic of such horizontal deflection frequency; mixer circuit means coupled to said first and second pulse-generating means for additively combining such first and second trains of pulses; and coupling means for applying pulses from said mixer circuit means to a receiver under test in such manner as to cause such receiver to display a pattern of vertical and horizontal stripes corresponding, respectively, to such first and second trains of produced pulses.

6. Test signal generating apparatus for use in testing a television receiver of the type employing an image-reproducing kinescope in which an electron beam is adapted to scan a target screen and having scanning circuitry associated therewith operative to deflect such beam horizontally and vertically at first and second frequencies, respectively, to produce a scanning raster, said apparatus comprising: means for deriving a train of signals corresponding in frequency to such horizontal deflection frequency; first pulse-generating means responsive to such derived signals for producing a train of pulses of frequency greater than such horizontal deflection frequency; second pulse-generating means for receiving such derived signals and including frequency multiplying and frequency dividing means for producing a second train of pulses whose frequency is an integral quotient of an even harmonic of such horizontal deflection frequency; mixer circuit means coupled to said first and second pulse-generating means for additively combining such first and second trains of pulses; a clipping circuit means for selecting only those pulses of such first train which occur during the occurrence of pulses of such second train; and coupling means for applying such selected pulses to a receiver under test in such manner as to cause such receiver to display a pattern of dots corresponding to such selected pulses.

7. The invention as defined by claim 5 including switch means for selectively disabling one or the other of said first and second pulse-generating means such that either said first or second train of produced pulses may be applied to such receiver under test.

8. The invention as defined by claim 6 including switch means for selectively disabling either of said first and second pulse-generating means, said switch means being so arranged as to disable said clipping circuit when either of said pulse-generating means is disabled.

References Cited in the file of this patent

UNITED STATES PATENTS

| | | |
|---|---|---|
| 2,292,045 | Burnett | Aug. 4, 1942 |
| 2,576,859 | Schroeder | Nov. 27, 1951 |
| 2,668,188 | Naslund | Feb. 2, 1954 |
| 2,683,187 | Rynn et al. | July 6, 1954 |
| 2,693,530 | Macdonald | Nov. 2, 1954 |
| 2,741,722 | Shields | Apr. 10, 1956 |
| 2,742,525 | Larkey | Apr. 17, 1956 |
| 2,818,526 | Meagher | Dec. 31, 1957 |

OTHER REFERENCES

"TV Cross-Hatch Generator," Service, January 1950, page 16.

"Dot Pattern Generator For Color and Monochrome," Radio and Television News, September 1954, pages 45, 46, 47, 134 and 135.